United States Patent Office

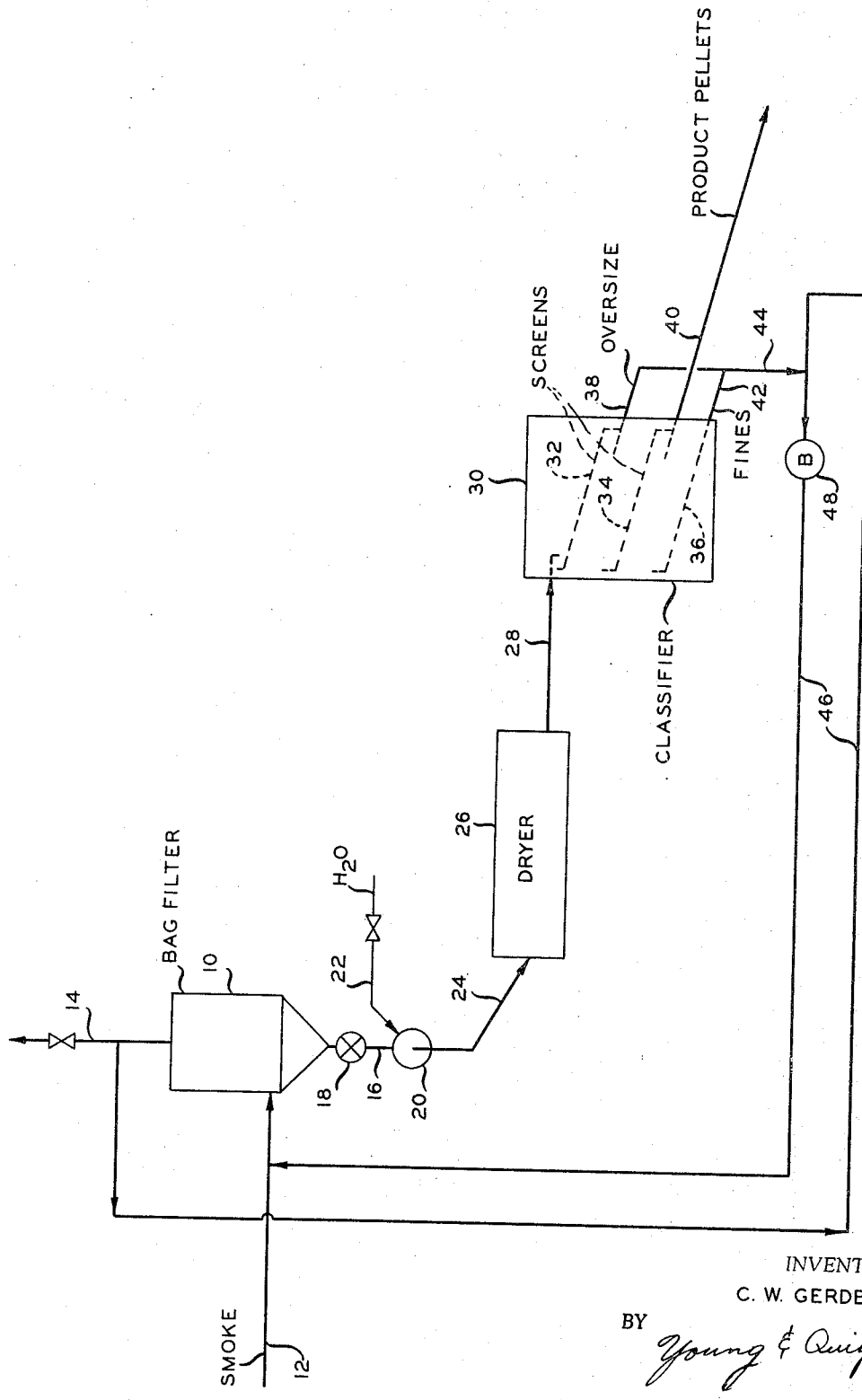

3,347,638
Patented Oct. 17, 1967

3,347,638
PROCESS FOR PRODUCTION OF CARBON
BLACK PELLETS
Charles W. Gerdes, Jr., Borger, Tex., assignor to Phillips
Petroleum Company, a corporation of Delaware
Filed Dec. 23, 1963, Ser. No. 332,738
1 Claim. (Cl. 23—314)

ABSTRACT OF THE DISCLOSURE

The photelometer of carbon black is increased by wet pelleting of the black with aqueous liquid, drying a stream of the wet pellets in a dryer, classifying the effluent pellets from the dryer into oversize, undersize, and product size pellet streams, disintegrating the oversize and undersize pellets, and feeding the resulting fines to the pelleting step in admixture with loose black and aqueous liquid, the fines being in the range of about 25 to 55 weight percent of the black feed to the pelleting step. The off-gas from a carbon black reactor is used as transport gas for the oversize and undersize pellets which are passed thru a blower to distintegrate the pellets before feeding the resulting fines to the pelleting step.

---

This invention relates to a process and apparatus for the production of carbon black pellets from flocculent carbon black involving the wet pelleting of the black.

In the wet pelleting of carbon black the effluent pellets from the pelleter contain water in the range of about 40 to 60 weight percent of the pellets, and usually about 50 percent water. These pellets are fed to a dryer which reduces the water content of the pellets below about one weight percent. One type of dryer commonly used is a rotary drum dryer surrounded by a gas-fire furnace chamber whereby the drum is heated externally and some of the hot combustion gas is also passed through the interior of the drum. Other types of dryers such as fluid bed dryers may also be used for the drying operation.

One of the problems involved in the production of carbon black pellets by wet pelleting flocculent carbon black with water lies in obtaining sufficiently high photelometer of the production pellets. Photelometer is a measure of the benzene extraction discoloration or the chloroform extraction discoloration. One factor influencing the photelometer has been found to be the maximum drying temperature. It has now been found that the photelometer of the product black in the dried pellets can be materially increased several points by separating at least 25 weight percent of the pellet stream from the dryer as oversize and undersize pellets, comminuting the oversize and undersize streams of pellets, and recycling the comminuted black to the wet pelleting step so that this recycled black is continuously incorporated in the flocculent black being pelleted and appears in the product pellets. In conventional wet pelleting and drying of the wet pellets, the photelometer of the black is frequently no higher than about 85 and rubber manufacturers frequently specify a higher photelometer such as 90. This invention produces pelleted carbon black which has a photelometer at least several points higher than conventionally produced by a similar process without the recycle feature and up to a photelometer in the range of 90 to 95.

Accordingly, this invention is concerned with a solution to the problem of increasing the photelometer of dryed carbon black pellets in a wet pelleting process.

A principal object of the invention is to provide an improved process and apparatus for increasing the photelometer of dryed carbon black pellets produced by wet pelleting flocculent carbon black recovered from a carbon black process and drying the wet pellets. A further object of the invention is to provide a process and apparatus which simultaneously classifies and improves the photelometer of dryed carbon black pellets. Other objects of the invention will become apparent to one skilled in the art upon consideration of the accompanying disclosure.

A broad aspect of the invention comprises wet pelleting flocculent carbon black from a carbon black process with aqueous liquid, passing a stream of the wet pellets through a dryer so as to dry same, classifying the effluent pellet stream from the dryer into oversize, product size, and undersize pellet streams, disintegrating or comminuting the oversize and undersize streams while recovering the product size stream as product of the process, and recycling the comminuted or disintegrated carbon black to the wet pelleting step so as to include same in the product pellets. A further refinement of the invention comprises circulating a stream of off-gas from the bag filter unit or a carbon black recovery system from the bag filter stack or off-gas outlet to the feed inlet of the bag filter unit by means of a blower and passing the oversize and undersize pellet streams into the transport gas stream upstream of the blower so that the blades of the blower disintegrate or comminute the pellets to a relatively fine particle size. It is essential to recycle the pellets in fine particle size so that they are distributed rather uniformily in the flocculent black being wet pelleted. In order to obtain or effect a substantial increase in the photelometer of the product pellets, it is necessary that at least 25 weight percent of the effluent dry pellet stream from the dryer be recycled.

The proportions of pellets in the classified streams depends upon the classification technique utilized. In a specific plant operation the effluent pellet stream from the dryer was passed through a commercial stream classifier provided with a 10 mesh screen at an upper level and a 35 mesh screen at a lower level. From 10 to 25 weight percent of the feed to the classifier was oversize, i.e., larger than 10 mesh, and from 15 to 30 weight percent of the feed was smaller than 35 mesh. The intermediate size pellets (10 to 35 mesh) constituted a maximum of 75 and a minimum of 45 weight percent of the feed.

A more complete understanding of the invention may be obtained by reference to the accompanying schematic drawing which illustrates one arrangement of apparatus and flow in accordance with the invention.

Referring to the drawing, a conventional bag filter unit 10 which is in a carbon black recovery flow line of a carbon black plant is fed a stream of smoke downstream of a quenching zone (not shown) through a line 12. The carbon black in the smoke stream is recovered in conventional filter bags in the upper section of filter 10 and the recovered flocculent black falls to the bottom of the unit. Off-gas from the filter is vented through stack or line 14 or passed to some auxiliary use in the plant. Flocculent carbon black is passed through line 16 under the control of a feeder valve 18 to wet pelleter 20 which is a conventional pug mill type mixer to which water is fed through line 22 in regulated amount to incorporate about 50 weight percent of water in the black.

In conventional operation one bag filter unit supplies feed to a surge vessel of substantial horizontal dimension which then feeds to a plurality of pellet mills which in turn feed to a plurality of dryers.

Effluent pellets from pellet mill 20 containing about 50 weight percent water are passed through line 24 into dryer 26 which may be any type of dryer but is conventionally a rotating drum dryer heated by a surrounding furnace jacket with provision for circulating furnace combustion gas through the dryer. This is a conventional type dryer. The effluent pellets containing less than about one weight percent moisture and usually less than 0.5 percent moisture are passed through line 28 into classifier 30 which contains a coarse screen 32 and a fine screen 34 and a receiving plate 36. A stream of oversize pellets are recovered through line 38, a stream of product pellets through line 40 and a stream of undersize pellets through line 42. The streams of pellets in lines 38 and 42 pass into line 44 for delivery to recycle and comminuting means discussed below.

Classifier 30 may be of any type, but one found to be unusually effective and efficient in the invention is a commercial Hummer screen type classifier.

Screens 32 and 34 in the Hummer classifier are vibratory screens which vibrate at a rate of several hundred vibrations per minute and the screens are slightly inclined as illustrated in the drawing. In one application screen 32 was a 10 mesh screen and screen 34 was a 35 mesh screen. These screens are 5' by 5' in size. These sizes of screens are effective in the usual wet pelleting carbon black process because they make a separation of oversize and undersize pellets of at least 25 weight percent of the feed to the classifier and usually a higher percent up to 55 weight percent. This means that the screened out carbon black is in the range of about 25 to 55 weight percent of the black feed to the wet pelleting step.

It is to be understood that any continuous method or apparatus for classifying the pellets which separates at least 25 weight percent of the effluent pellet stream from the dryer into oversize and undersize pellets is operable in the invention.

The combined oversize and undersize pellet streams pass through line 44 into transport 46 in which blower 48 is positioned so as to recycle off-gas from line 14 through the blower and back to the bag filter unit as through line 12. Feeding the off-sized pellet stream into gas transport line 46 upstream of blower 48 has the effect of passing the pellets through the blades of the blower where they are comminuted or distintegrated and the resulting fines are suspended or entrained in the transport gas for transport to the bag filter. The fines are recovered in the bag filter along with flocculent black carried in the smoke feed to the filter and the resulting mixture of flocculent black and recycled fines is fed as hereinbefore described through the pelleting, drying, and classifying system.

The Hummer screen was installed in plant apparatus without knowledge of the improved effect on photelometer that would result from the classification and recycling of oversize and undersize material as fines to the wet pelleting step. However, after a period of operation in the plant, the improvement in photelometer was evident.

Another advantage that was evident from the use of the Hummer screen in the process which is cumulative with the effect of recycling is the cooling of the hot pellets product stream from the dryer. This cooling effect is in the range of 100 to 200° F. and permits higher temperature treatment in the upstream dryer than normally feasible because of maximum safe storage temperature. However, the increase in photelometer effected by the recycling, alone, amounts to 3 to 5 points. In other words, in a process in which pellets having a photelometer of 85 are being produced without the classification and recycling in accordance with the invention, the photelometer is easily increased to the range of 88 to 90 merely by operating in the same manner except for the recycling of 25 or more weight percent of the oversize and undersize pelleted material in finely comminuted form to the wet pelleting step. By operating the dryer at higher temperatures than otherwise possible, due to the cooling effect produced by the classifier, an additional increase in photelometer of several points is also feasible. The method and apparatus for increasing the photelometer by cooling the product pellets before storage in a vibratory conveyor of a different type and operating the dryer at a higher temperature than normal is disclosed and claimed in copending application S.N. 332,790, filed Dec. 23, 1963, now Patent No. 3,282,577.

It is to be understood that the photelometer value of a carbon black product is a value which is indicative of other values of the product including rubber characteristics such as modulus.

Certain modifications of the invention will become apparent to those skilled in the art and the illustrative details disclosed are not to be construed as imposing unnecessary limitations on the invention.

I claim:

In a continuous process comprising recovering in a bag filter flocculent carbon black from a smoke stream from a carbon black reactor, wet pelleting a stream of the recovered black with water, and drying a stream of the wet pellets from the pelleting step, the method of increasing the photelometer of the black in the dried pellets stream comprising the steps of:

(1) screening the dried pellet stream so as to separate a stream of oversize pellets and a stream of undersize pellets and fines, leaving a product stream of intermediate size pellets amounting to from 45 to 75 weight percent of the dried pellet stream;

(2) passing a stream of off-gas from said bag filter thru a blower as a transport gas to the feed inlet of said bag filter;

(3) passing the streams of oversize and undersize pellets of step (1) into the transport gas of step (2) upstream of said blower, thereby disintegrating the pellets of said streams therein and forming a suspension of the resulting fines in said transport gas so as to return same to said bag filter;

(4) recovering said fines along with flocculent black from said smoke stream; and (5) passing a stream of the recovered fines and black of step (4) to the wet pelleting step, the recovered fines being in the range of 25 to 55 weight percent of the total black feed to said pelleting step, thereby increasing the photelometer of the product black as compared to product black produced by corresponding steps without recycle of comminuted oversize and undersize pellets.

References Cited

UNITED STATES PATENTS

| 2,327,016 | 9/1943 | Carney | 23—314 |
| 2,867,513 | 1/1959 | Boyer | 23—314 |
| 2,872,300 | 2/1959 | Pollock | 23—314 |
| 2,917,374 | 12/1959 | Wood | 23—314 |
| 3,050,378 | 9/1962 | Kron | 23—314 |
| 3,116,119 | 12/1963 | Osburn | 23—314 |

NORMAN YUDKOFF, *Primary Examiner.*

G. HINES, *Assistant Examiner.*